(12) United States Patent
Kunikata et al.

(10) Patent No.: US 12,535,462 B2
(45) Date of Patent: Jan. 27, 2026

(54) ELECTROCHEMICAL DETECTION METHOD FOR CATALYTIC REACTION PRODUCT, ELECTROCHEMICAL DETECTION APPARATUS AND TRANSDUCER

(71) Applicants: JAPAN AVIATION ELECTRONICS INDUSTRY, LIMITED, Tokyo (JP); TOHOKU UNIVERSITY, Miyagi (JP)

(72) Inventors: Ryota Kunikata, Tokyo (JP); Atsushi Suda, Tokyo (JP); Hiroyuki Hayashi, Tokyo (JP); Kosuke Ino, Miyagi (JP); Tomokazu Matsue, Miyagi (JP)

(73) Assignees: JAPAN AVIATION ELECTRONICS INDUSTRY, LIMITED, Tokyo (JP); TOHOKU UNIVERSITY, Miyagi (JP)

( * ) Notice: Subject to any disclaimer, the term of this patent is extended or adjusted under 35 U.S.C. 154(b) by 1102 days.

(21) Appl. No.: 17/613,361

(22) PCT Filed: Apr. 10, 2020

(86) PCT No.: PCT/JP2020/016080
§ 371 (c)(1),
(2) Date: Nov. 22, 2021

(87) PCT Pub. No.: WO2020/250559
PCT Pub. Date: Dec. 17, 2020

(65) Prior Publication Data
US 2022/0221424 A1    Jul. 14, 2022

(30) Foreign Application Priority Data
Jun. 13, 2019 (JP) .................................. 2019-110265

(51) Int. Cl.
*G01N 27/49* (2006.01)
*G01N 27/27* (2006.01)
*G01N 33/557* (2006.01)

(52) U.S. Cl.
CPC ............. *G01N 27/49* (2013.01); *G01N 27/27* (2013.01); *G01N 33/557* (2013.01)

(58) Field of Classification Search
CPC .. C12Q 1/001; G01N 27/3275; G01N 27/403; G01N 27/416; G01N 33/54306; G01N 33/5438
See application file for complete search history.

(56) References Cited

U.S. PATENT DOCUMENTS 5,212,050 A    5/1993  Mier et al.
8,470,144 B2 *  6/2013  Suda .................. G01N 27/3272
                                                    204/287

(Continued)

FOREIGN PATENT DOCUMENTS

CN    108291891 A    7/2018
CN    108474759 A    8/2018
(Continued)

OTHER PUBLICATIONS

English Machine Translation of KR20120138082 (Year: 2012).*
(Continued)

*Primary Examiner* — Gurpreet Kaur
(74) *Attorney, Agent, or Firm* — Greenblum & Bernstein, P.L.C.

(57) ABSTRACT

A method of electrochemically detecting a catalytic reaction product by confining the catalytic reaction product within a first lump of liquid and by using a working electrode disposed in the first lump of liquid and a counter electrode disposed in a second lump of liquid, the catalytic reaction product being generated by progress of a catalytic reaction (Continued)

in the first lump of liquid, and the second lump of liquid being in contact with the first lump of liquid to form a liquid-liquid interface, the method including placing a retaining structure in the liquid bath, the retaining structure allowing the first lump of liquid to permeate and being able to retain the first lump of liquid; and allowing the catalytic reaction to progress and detecting the catalytic reaction product with the first lump of liquid retained to the retaining structure.

15 Claims, 6 Drawing Sheets

(56) References Cited

U.S. PATENT DOCUMENTS

| | | | |
|---|---|---|---|
| 2003/0077642 A1 | 4/2003 | Fritsch et al. | |
| 2009/0000957 A1* | 1/2009 | Dubin ................... | C12Q 1/001 205/688 |
| 2013/0345088 A1 | 12/2013 | Noji et al. | |
| 2017/0176430 A1 | 6/2017 | Noji et al. | |
| 2017/0336384 A1 | 11/2017 | Ino et al. | |
| 2018/0372676 A1 | 12/2018 | Kunikata et al. | |
| 2019/0086356 A1 | 3/2019 | Hayashi et al. | |
| 2019/0277828 A1 | 9/2019 | Hiramoto et al. | |
| 2020/0040468 A1 | 2/2020 | Ino et al. | |
| 2020/0173978 A1 | 6/2020 | Hayashi et al. | |
| 2020/0407769 A1 | 12/2020 | Tabata et al. | |

FOREIGN PATENT DOCUMENTS

| | | | | |
|---|---|---|---|---|
| CN | 109073587 A | | 12/2018 | |
| EP | 2913667 | | 9/2015 | |
| EP | 3379241 A1 | | 9/2018 | |
| EP | 3605110 A1 | | 2/2020 | |
| JP | 2005-227096 A | | 8/2005 | |
| JP | 2006-266795 A | | 10/2006 | |
| JP | 2013-092437 A | | 5/2013 | |
| JP | 2015-059929 A | | 3/2015 | |
| JP | 2017-096721 A | | 6/2017 | |
| JP | 2018-149524 A | | 9/2018 | |
| KR | 20120138082 A | * | 12/2012 | ......... G01N 27/3275 |
| TW | 201835385 A | | 10/2018 | |
| WO | WO2012/121310 A1 | | 9/2012 | |
| WO | WO2015/040930 A1 | | 3/2015 | |
| WO | WO2016/006208 A1 | | 1/2016 | |
| WO | WO-2016133528 A1 | * | 8/2016 | ........... E21B 49/081 |
| WO | WO2018/105454 A1 | | 6/2018 | |
| WO | WO 2018/168212 A1 | | 9/2018 | |
| WO | WO2018/181488 A1 | | 10/2018 | |
| WO | WO2019/168200 A1 | | 9/2019 | |

OTHER PUBLICATIONS

Office Action in family member Chinese application No. 202080042214.9 dated Aug. 3, 2024 with English translation of the Office Action.
European Search Report in family member European application No. /patent No. 24181195.9-1111/4403619 dated Oct. 28, 2024.
Extended European Search Report (EESR) issued on Aug. 30, 2022 in European Patent Application No. 20822801.5.
Office Action in family member Chinese application No. 202080042214.9 dated Nov. 11, 2023 with English translation of the Office Action.
S. Sakakihara et al., "A single-molecule enzymatic assay in a directly accessible femtoliter droplet array", *Lab on a Chip*, Oct. 2010, pp. 3355-3362.
International Search Report issued on Jun. 30, 2020 in WIPO application No. PCT/JP2020/016080, along with an English translation thereof.
European Office Action in family member European application No. 24181195.9-1111 dated Jul. 15, 2025.

* cited by examiner

ELECTROCHEMICAL DETECTION METHOD FOR CATALYTIC REACTION PRODUCT, ELECTROCHEMICAL DETECTION APPARATUS AND TRANSDUCER

TECHNICAL FIELD

The present invention relates to a technique for electrochemically detecting a product generated by progress of a catalytic reaction in a solution and dissolved in the solution.

BACKGROUND ART

Detection sensitivity of a catalytic reaction product generated by catalytic reaction such as enzyme reaction and dissolved in a solution depends on the concentration of the product in the solution. In order to improve the concentration of the product in the solution, for example, longer catalytic reaction time is preferable or a smaller volume of the solution is preferable.

When the volume of the solution is extremely small, evaporation leads to a decrease in the volume of the solution, making detection impossible. Such a problem arises noticeably in the case of a long catalytic reaction time.

Patent literature 1 and Non-patent literature 1 disclose a configuration that can prevent a solution from evaporating. Patent literature 1 discloses, as a technique related to ELISA (Enzyme-Linked ImmunoSorbent Assay), a configuration in which droplets of a hydrophilic solvent, which is an enzyme reaction field, are placed in a storage part (well) and the storage part is sealed with a hydrophobic solvent.

Regarding an ELISA-related technique, Non-patent literature 1 discloses a configuration in which a pattern of hydrophilic region is formed by forming a hydrophobic region on a hydrophilic surface, and droplets located on the pattern of hydrophilic region (that is, the enzyme reaction field) are covered with oil.

PRIOR ART LITERATURE

Patent Literature

Patent literature 1: International Publication No. WO2012/121310

Non-Patent Literature

Non-patent literature 1: S. Sakakihara et al., "A Single-molecule enzymatic assay in a directly accessible femtoliter droplet array", Lab Chip, 2010, 10, 3355-3362

SUMMARY OF THE INVENTION

Problems to be Solved by the Invention

As described above, evaporation of the solution can be prevented by covering a solution, which is a catalytic reaction field, with a liquid which is different from the solution. It is thereby possible to avoid a problem of evaporation causing a decrease in the volume of the solution and making detection impossible.

The state in which the solution is covered with a liquid needs to be maintained stably and appropriately in a progression process of a catalytic reaction and in a process of detecting a catalytic reaction product. For example, when a situation occurs in which a liquid-liquid interface between the solution and the liquid is disturbed or the shape of the solution is changed considerably by application of vibration or shock, the progression of the catalytic reaction or detection processing is thereby affected, resulting in deterioration of detection accuracy or detection errors.

Even when a well is used, vibration or shock may cause part of the solution to spill out of the well or the liquid may flow into the well.

It is an object of the present invention to provide a technique capable of detecting a catalytic reaction product stably and with high sensitivity.

Means to Solve the Problems

Technical matters described here will be described not to explicitly or implicitly limit the present invention claimed in the claims or to further express a possibility of admitting such a limitation imposed by persons other than those who benefit from the present invention (e.g., applicant and patentee), but to simply make it easy to understand main points of the present invention. A summary of the present invention from other standpoints can be understood from the claims at the time of filing the present application.

The technique disclosed here is an electrochemical detection technique to which the technique that a first lump of liquid, where a catalytic reaction progresses, is covered with a second lump of liquid is applied.

The technique uses a liquid bath that contains a working electrode, a counter electrode, a first lump of liquid and a second lump of liquid.

The first lump of liquid has conductivity. The working electrode is located in the first lump of liquid. The first lump of liquid is held to a liquid-retaining structure that allows the first lump of liquid to permeate and can retain the first lump of liquid. The liquid-retaining structure is located in the vicinity of the working electrode.

The second lump of liquid has conductivity. The first lump of liquid and the second lump of liquid form a liquid-liquid interface and the catalytic reaction product is insoluble in the second lump of liquid. The counter electrode is located in the second lump of liquid.

Effects of the Invention

According to the present invention, since the liquid-retaining structure stably and appropriately maintains the state in which the first lump of liquid is covered with the second lump of liquid, it is possible to stably detect a catalytic reaction product with high sensitivity.

DETAILED DESCRIPTION OF THE EMBODIMENTS

The present embodiment will be described with reference to the accompanying drawings.

Figure 1:
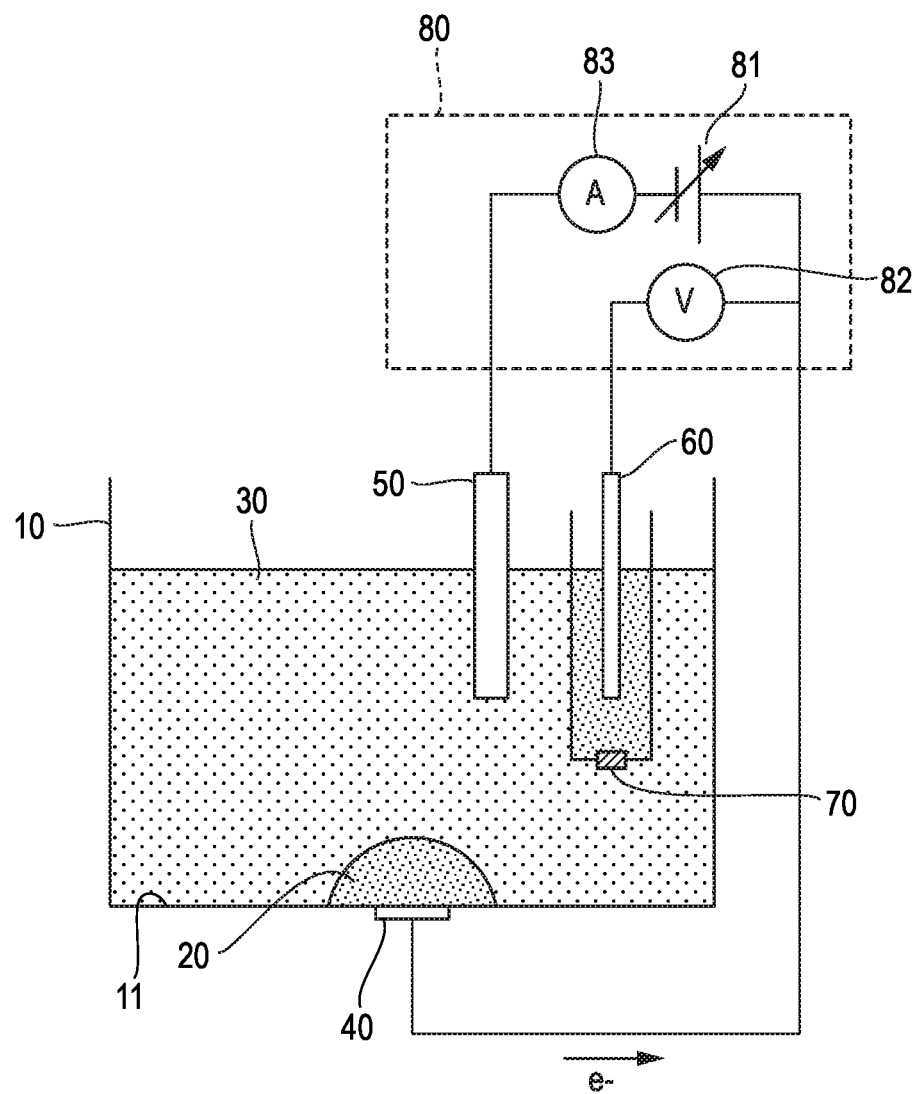
FIG. 1 is a diagram for describing an overview of an electrochemical detection apparatus according to an embodiment.

According to the embodiment, electrochemically detected is a product generated by progress of a catalytic reaction in a first lump of liquid (that is, a lump of solution, which is a catalytic reaction field) and dissolved in the first lump of liquid. FIG. 1 schematically shows a configuration example of a detection apparatus 1 of the present embodiment.

The detection apparatus 1 includes a liquid bath 10, a working electrode 40, a counter electrode 50, a reference electrode 60 and a potentiostat 80. The liquid bath 10 contains a first lump of liquid 20 and a second lump of liquid 30. The first lump of liquid 20 and the second lump of liquid 30 form a liquid-liquid interface (that is, an interface between two liquids). As shown in FIG. 1, the first lump of liquid 20 is placed on a bottom surface 11 of the liquid bath 10 and is covered with the second lump of liquid 30.

The working electrode 40 is located at the bottom surface 11 of the liquid bath 10 and covered with the first lump of liquid 20. That is, the working electrode 40 is in contact with the first lump of liquid 20, whereas it is not in contact with the second lump of liquid 30. The counter electrode 50 and the reference electrode 60 are placed in the second lump of liquid 30 and are electrically connected to the working electrode 40 via the liquid-liquid interface between the first lump of liquid 20 and the second lump of liquid 30. In FIG. 1, reference numeral 70 denotes a salt bridge.

The working electrode 40, the counter electrode 50 and the reference electrode 60 are connected to the potentiostat 80 in this example. The potentiostat 80 functions as a constant-voltage power-supply apparatus and includes a variable power supply 81, a voltmeter 82 and an ammeter 83.

The catalytic reaction product is confined in the first lump of liquid 20 and is not dissolved in the second lump of liquid 30 (that is, the product does not move from the first lump of liquid 20 to the second lump of liquid 30). An oxidation reduction reaction between the catalytic reaction product and the working electrode 40 causes a current to flow through the working electrode 40. By detecting this current, the catalytic reaction product is detected or a quantitative analysis is performed.

Although FIG. 1 illustrates only one working electrode 40, two or more working electrodes 40 arranged, for example, in an array are generally installed at a substrate and the substrate is located on the bottom surface 11 of the liquid bath 10. When the detection apparatus 1 includes two or more working electrodes 40, the detection apparatus 1 includes two or more first lumps of liquid 20. Each of the two or more working electrodes 40 is covered with the corresponding one of the two or more first lumps of liquid 20. The first lumps of liquid 20 are independent of each other and the first lumps of liquid 20, which are different from each other, are separated by the second lump of liquid 30. The second lump of liquid 30 is a single liquid lump. The second lump of liquid 30 and any one of the two or more first lumps of liquid 20 form a liquid-liquid interface. Each of the two or more first lumps of liquid 20 is covered with the second lump of liquid 30.

Hereinafter, an electrochemical detection method according to the present embodiment applied to ELISA will be described.

According to ELISA, an antigen-antibody complex is detected or quantitative analysis is performed, for example, by labeling an antigen or antibody (that is, immunoglobulin) contained in a sample with an enzyme and detecting a product obtained by a reaction between the enzyme and a substrate. For example, the following operation is performed in a combination of a sandwich ELISA (sandwich ELISA protocol) and an electrochemical detection method. However, operation such as cleaning, incubation (leaving a product at a constant temperature) is not specified.

(1) Binding of capture antibody to a solid phase (the solid phase includes a surface of the working electrode and a surface of a solid substance in the vicinity of the working electrode)
(2) Blocking treatment of the solid phase
(3) Addition of antigen (protein to be detected)
(4) Addition of primary antibody
(5) Addition of enzyme-labeled secondary antibody
(6) Addition of substrate-containing first lump of liquid (by enzyme reaction, enzyme reaction product is accumulated in the vicinity of the working electrode)
(7) Electrochemical detection of enzyme reaction product using the working electrode In the embodiment, an operation of covering the entire first lump of liquid 20 with the second lump of liquid 30 is added as shown in FIG. 1.

The second lump of liquid 30 is insoluble in the conductive first lump of liquid 20, and is a conductive liquid. In ELISA, the first lump of liquid 20 is generally an aqueous solution having a buffering ability, and thus the second lump of liquid 30 is, for example, an organic solvent that is insoluble in water and can dissolve a support electrolyte that is for conductivity.

The organic solvent is preferably a liquid that can be easily handled as a solvent for electrochemical detection, in other words, preferably, the organic solvent is a liquid at ordinary temperature and has low reactivity against water and electrode materials (such as, gold, platinum) within a detection potential range. For example, nitrobenzene, 1,2-dichlorobenzene, 1-nitro-2-(n-octyloxy) benzene, 1,2-dichloroethane, 1,4-dichlorobutane, 1,6-dichlorohexane, 1-octanol or 1,9-decadiene is suitable for the organic solvent.

As the support electrolyte that is soluble in these organic solvents and can impart conductivity to the organic solvents, a support electrolyte used for electrochemical detection in a common non-aqueous solution may be adopted. For example, the support electrolyte is preferably a salt containing, as its anion, any one of chloride ion, bromide ion, iodide ion, sulfate ion, nitrate ion, hyperchloric acid ion, tetrafluoroboric acid ion, hexafluorophosphoric acid ion and sulfonic acid ion, and, as its cation, any one of lithium ion, sodium ion, potassium ion, rubidium ion, cesium ion, ammonium ion and tetraalkyl ammonium ion having alkyl groups of arbitrary chain lengths.

A combination of the labeling enzyme and the substrate is a combination having electrochemical activity and capable of generating a product soluble in the first lump of liquid 20 and not soluble in the second lump of liquid 30. When the first lump of liquid 20 is an aqueous solution and the second lump of liquid 30 is the aforementioned organic solvent, a combination of, for example, alkaline phosphatase and phosphoric acid 4-aminophenyl ester or a combination of, for example, horseradish peroxidase and potassium ferricyanide is suitable for a combination of the labeling enzyme and the substrate.

Next, the liquid-retaining structure to stably and appropriately maintain the state in which the first lump of liquid 20 is covered with the second lump of liquid 30 will be described. In the above-described example of ELISA, the liquid liquid-retaining structure is formed before step (1). Hereinafter, the liquid liquid-retaining structure will simply be referred to as a "retaining structure."

The retaining structure allows the first lump of liquid 20 to permeate and can also retain the first lump of liquid 20. The retaining structure is, for example, a porous body having a hydrophilic surface (in this regard, the "surface" is an air-contacting part when the retaining structure is placed in the air, and the inner surface of pores is also included) or dry gel formed by a polymer that forms hydrogels when moistened with water. Although not shown in FIG. 1, the retaining structure is placed at a place in the liquid bath 10 where the first lump of liquid 20 is located, that is, in a local space facing the working electrode 40.

FIG. 2 and FIG. 3 show several examples of the retaining structure. From the standpoint of easy-to-understand illustration, only one working electrode 40 is shown in FIG. 2 and FIG. 3 and the working electrode 40 has a circular surface shape in this example. In FIG. 2 and FIG. 3, reference numeral 100 denotes a substrate at which the working electrode 40 is installed.

Figure 2A:
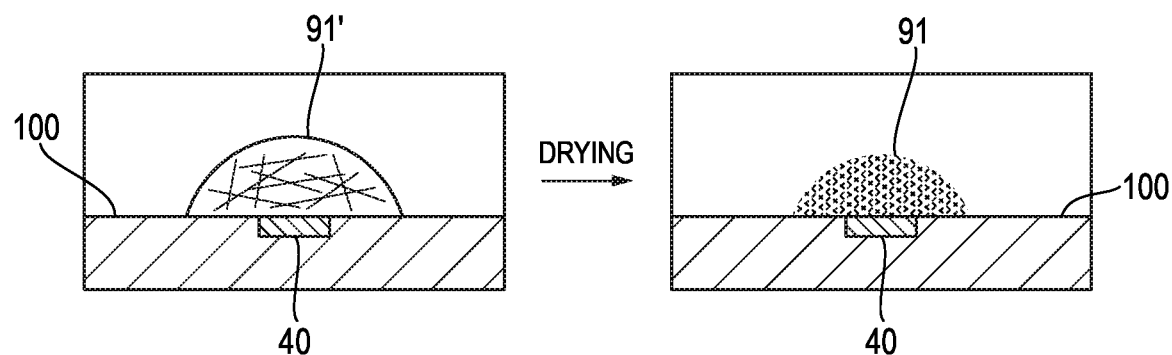
FIG. 2A is a diagram for describing a first example of a retaining structure.

First Example: FIG. 2A

A retaining structure 91 is a porous body. Examples of the material of the porous body include materials made of an organic polymer such as cellulose having a pore diameter of on the order of 0.1 to 10 μm, nitrocellulose, acetylcellulose and polyvinylidene difluoride that has been appropriately subjected to a hydrophilic treatment or include inorganic materials such as silica, silicon and alumina (aluminum oxide).

The retaining structure 91, which is a porous body of the organic polymer, is formed by dissolving the polymer as a raw material in an appropriate solvent, placing the solution 91' on the working electrode 40 using a technique such as spotting, screen printing and inkjet printing, and then drying the solvent. The solvent contains an appropriate cross-linking agent if necessary.

For example, the retaining structure 91, which is a porous body of nitrocellulose, is formed by dropping, onto the working electrode 40, droplets of the solution 91' obtained by dissolving nitrocellulose in a methyl isobutyl ketone (4-methyl-2-pentanone) solvent using a micropipette, and then removing the solvent by natural drying.

The retaining structure 91, which is a porous body of an inorganic material, is formed using, for example, a technique of forming porous silica on the working electrode 40 by a sol-gel method or a technique of forming porous silicon or porous alumina on the working electrode 40 by an anode oxidation method.

Figure 2B:
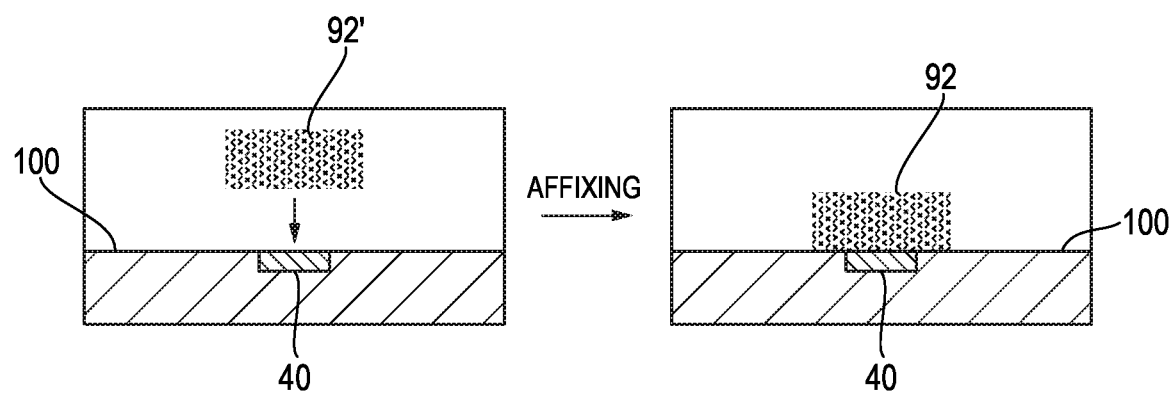
FIG. 2B is a diagram for describing a second example of the retaining structure.

Second Example: FIG. 2B

A retaining structure 92 is a porous body. In this example, the above-described porous body is formed in advance as a small block 92' and the small block 92' are pasted onto the working electrode 40 as the retaining structure 92.

Figure 2C:
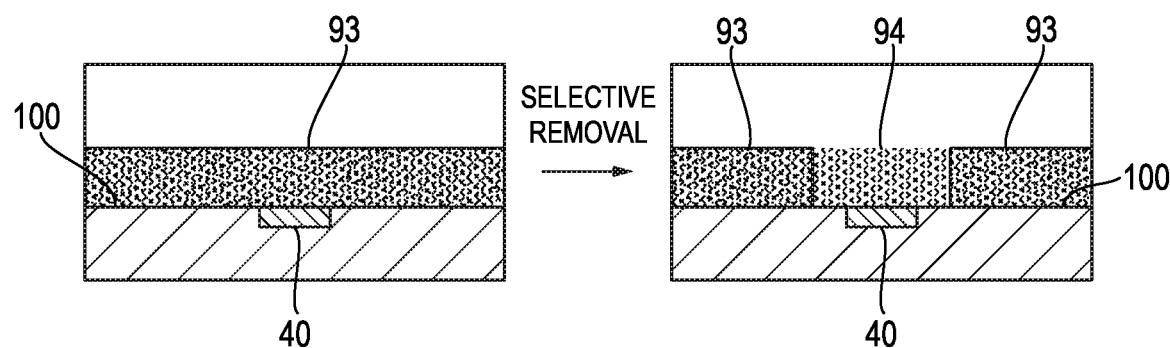
FIG. 2C is a diagram for describing a third example of the retaining structure.

Third Example: FIG. 2C

A porous body is formed in the form of a sheet on the substrate 100 where the working electrode 40 is located, using a technique such as spin coating. The porous body is impregnated with resin, which is insoluble in both of the first lump of liquid 20 and the second lump of liquid 30, to form a resin-impregnated sheet-like porous body 93 in which all the pores are filled with the resin. After that, only the resin on the working electrode 40 is selectively removed by an appropriate solvent. As a result, a retaining structure 94, which is a porous body, is formed.

A sheet-like porous body is formed by, for example, coating the substrate 100, which the working electrode 40 is located at, by spin coating with a solution resulting from dissolving nitrocellulose in a methyl isobutyl ketone solvent, and then removing the solvent by natural drying. Furthermore, negative photosensitive resin is dropped onto the porous body to impregnate the porous body with the photosensitive resin. By selectively removing only the photosensitive resin on the working electrode 40 by photolithography, the retaining structure 94, which is a porous body, is formed.

Figure 2D:
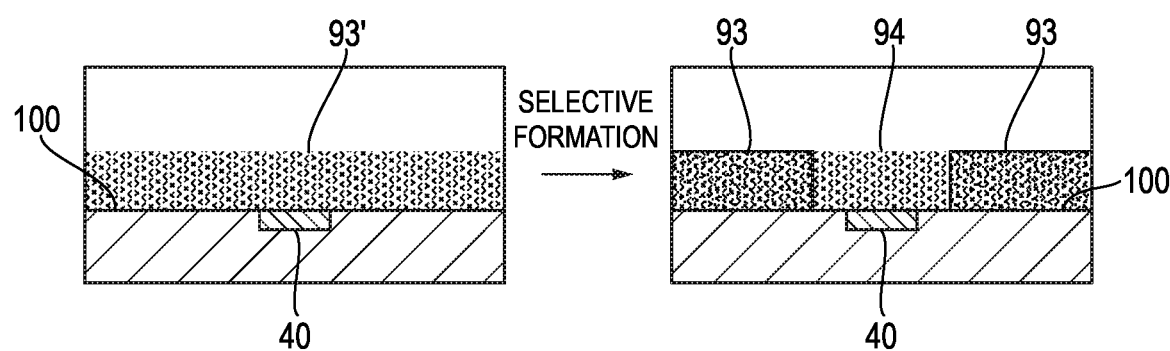
FIG. 2D is a diagram for describing a fourth example of the retaining structure.

Fourth Example: FIG. 2D

The retaining structure 94 is formed by selectively impregnating the region other than the working electrode 40 of the sheet-like porous body 93' described in the third example with resin insoluble in both of the first lump of liquid 20 and the second lump of liquid 30, using a technique such as spotting, screen printing and inkjet printing. In FIG. 2D, reference numeral 93 denotes the resin-impregnated sheet-like porous body.

Figure 3A:
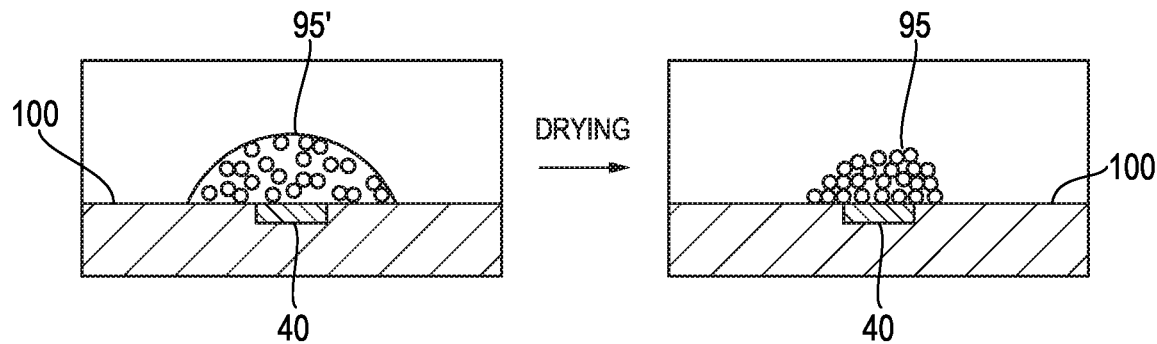
FIG. 3A is a diagram for describing a fifth example of the retaining structure.

Fifth Example: FIG. 3A

The porous body can be formed by agglomerated minute particles. A retaining structure 95, which is a porous body, is formed by, for example, agglomerating on the working electrode 40 minute particles such as polystyrene minute particles each having a diameter of on the order of 0.1 to 10 μm, silica minute particles, alumina minute particles, magnetic minute particles used for protein separation and refining or the like or agarose minute particles used as carriers for an affinity column.

For example, binder molecules for binding minute particles together can be used to agglomerate the minute particles. A retaining structure 95, which is an agglomerate of minute particles, is formed by suspending the binder molecules and the minute particles in an appropriate solvent, dropping droplets of a suspension 95' onto the working electrode 40, and then drying the solvent. When molecules, a binding process by which progresses by an operation such as heating or light irradiation, are used as the binder molecules, the operation are executed before or after drying the solvent.

Minute particles may be agglomerated on the working electrode 40 to which a DC voltage or AC voltage is applied, using an electrophoretic force or dielectrophoretic force produced thereby.

Figure 3B:
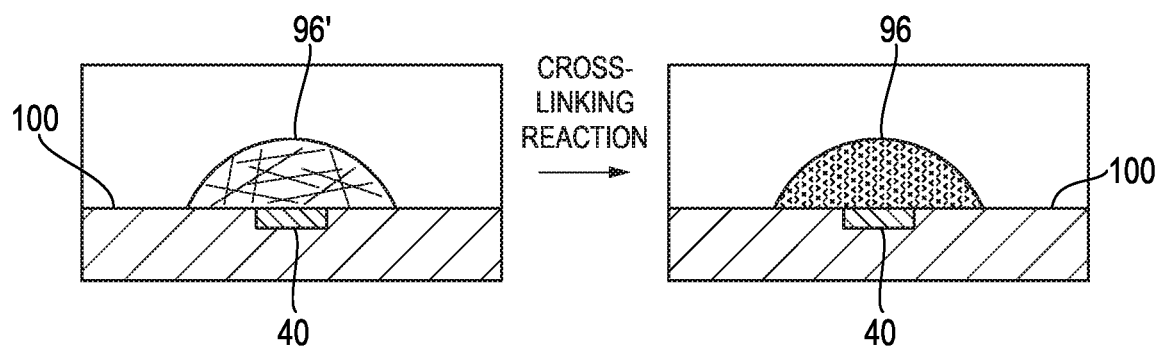
FIG. 3B is a diagram for describing a sixth example of the retaining structure.

Sixth Example: FIG. 3B

A retaining structure 96 is formed by a polymer that forms hydrogels by absorption of water. Examples of the polymer that forms hydrogels by absorption of water include polyacrylic amide (poly(2-propenamide)), agarose, sodium alginate or collagen. By placing on the working electrode 40 a solution 96' of the polymer, which is a raw material, dissolved in an appropriate solvent, using a technique such as spotting, screen printing or inkjet printing, and then drying the solvent, the retaining structure 96, which is dry gel, is formed. The solvent may contain an appropriate cross-linking agent if necessary.

Collagen hydrogels are obtained by, for example, dropping droplets of the solution 96', which is obtained by dissolving collagen as a polymer and glutalaldehyde (1,5-pentanedial) as a cross-linking agent in a phosphoric acid buffer solution, onto the working electrode 40 using a micropipette, and then causing a cross-linking reaction to progress at a room temperature. The retaining structure 96 is formed by allowing the hydrogels to dry naturally.

In a first example shown in FIG. 2A and in fifth and sixth examples shown in FIGS. 3A and B, when the polymer solution 91' or 96' or a suspension 95' of minute particles is dropped onto the working electrode 40, the droplets are spread over regions other than a desired region. To avoid this, a well may be formed at the bottom surface 11 of the liquid bath 10.

Figure 4:
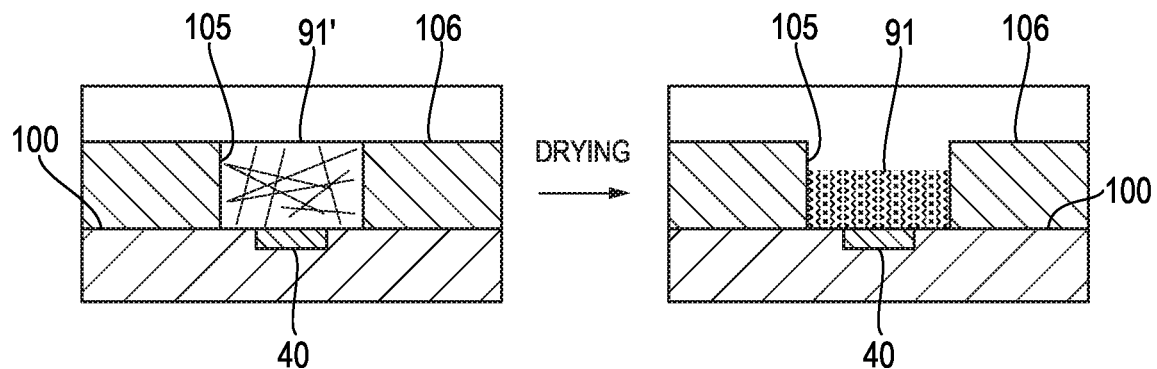
FIG. 4 is a diagram for describing the retaining structure to be placed in a well.

FIG. 4 shows an example in which a well 105 is formed at the substrate 100 located on the bottom surface 11 of the liquid bath 10. The working electrode 40 is located in the well 105. The well 105 is formed by placing hydrophobic resin, which is insoluble in both of the first lump of liquid 20 and the second lump of liquid 30, on the substrate 100 using a technique such as photolithography or screen printing. Reference numeral 106 in FIG. 4 denotes a layer of hardened resin. Like the example in FIG. 2A, FIG. 4 shows an example in which a retaining structure 91 is formed by drying the solution 91' of a polymer. The solution 91' is dropped into the well 105. As a result, the retaining structure 91 is placed in the well 105.

In the following description, the retaining structure 91, 92, 94, 95 and 96 are generically called "retaining structure 90." Placing on the working electrode 40 the retaining structure 90, which allows the first lump of liquid 20 to permeate, can retain the first lump of liquid 20, and is insoluble in both of the first lump of liquid 20 and the second lump of liquid 30, strongly retains the first lump of liquid 20 on the working electrode 40.

The retaining structure 90 is provided for each of working electrodes 40. Alternatively, a combination of the well 105 and the retaining structure 90 is provided for each of working electrodes 40.

After dropping the first lumps of liquid 20 onto the retaining structures 90, the second lump of liquid 30 is poured into the liquid bath 10. Progression of the enzyme reaction in ELISA and detection of the enzyme reaction product are performed for each working electrode 40 with the first lumps of liquid 20 retained to the retaining structures 90. The enzyme reactions corresponding to the working electrodes 40 proceed independently of each other, that is, any two of them do not affect each other. Similarly, detections of the enzyme reaction products corresponding to the working electrodes 40 are performed independently of each other, that is, any two of them do not affect each other.

According to the embodiment of the electrochemical detection method, the following effects are produced.
1) Since the retaining structure 90 strongly retains the first lump of liquid 20 on the working electrode 40, even though vibration or shock or the like is applied to the liquid bath 10, the state in which the first lump of liquid 20 is covered with the second lump of liquid 30 is maintained stably and appropriately. Therefore, high accuracy detection is performed stably.
2) Since the retaining structure 90 which is a three-dimensional structure has a larger surface area than a flat surface which is the electrode surface, it is possible to considerably increase the amount of catalyst supported thereby. Therefore, the catalytic reaction progresses efficiently and detection sensitivity improves noticeably.

As is clear from the embodiment, the catalytic reaction product is detected electrochemically. Therefore, the retaining structure 90 capable of securing the substance diffusion and the conduction path such as a porous body or gel does not adversely affect the catalytic reaction field.

Without being limited to the above-described embodiment, implementation conditions are as follows:
a) An object to be detected is the product generated by progress of a catalytic reaction in the first lump of liquid 20,
b) The concentration of the catalytic reaction product in the first lump of liquid 20 increases as the catalytic reaction progresses,
c) The catalytic reaction product can be detected electrochemically, and
d) The second lump of liquid 30 in which the catalytic reaction product does not dissolve can be selected.

ELISA uses an enzyme as a catalyst, but the catalyst is not limited to an enzyme. Examples of the catalyst may include metal catalyst, ribozyme, cells containing enzymes on the surface thereof or inside, organelle, minute particles that artificially adsorb or are artificially bound to these elements, and vesicle.

The sandwich ELISA forms a composite of capture antibody, antigen, primary antibody and enzyme-labeled secondary antibody, and thereby causes the catalyst to be indirectly bound to the solid phase, but the catalyst binding method is not limited to this. For example, the catalyst may be indirectly bound to the solid phase by hybridizing a probe DNA preliminarily bound to the solid phase surface with a single-strand DNA complementary with the probe DNA and labeled with the catalyst.

Alternatively, the catalyst may be indirectly bound to the solid phase by making antigen, peptide or sugar chain, these being preliminarily bound to the surface of the solid phase, interact with an antibody or a lectin that can specifically bind to those molecules and are labeled with the catalyst.

Such a binding method is already well known in expression analysis of using a DNA chip or a protein chip.

Alternatively, when measuring activity of the catalyst itself, the catalyst may be directly bound to the surface of the solid phase.

Figure 5A:
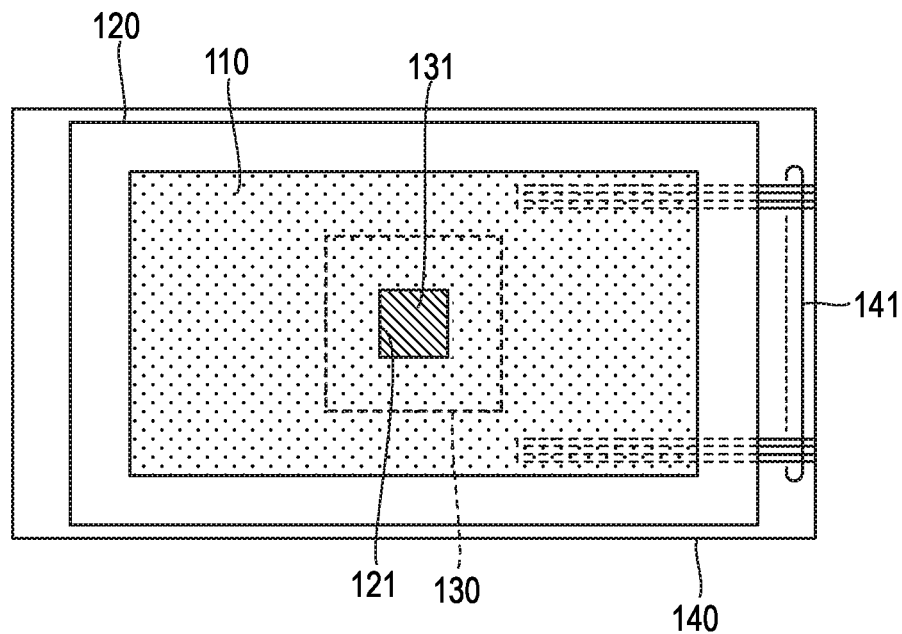
FIG. 5A is a plan view of a transducer according to an embodiment.
Figure 5B:
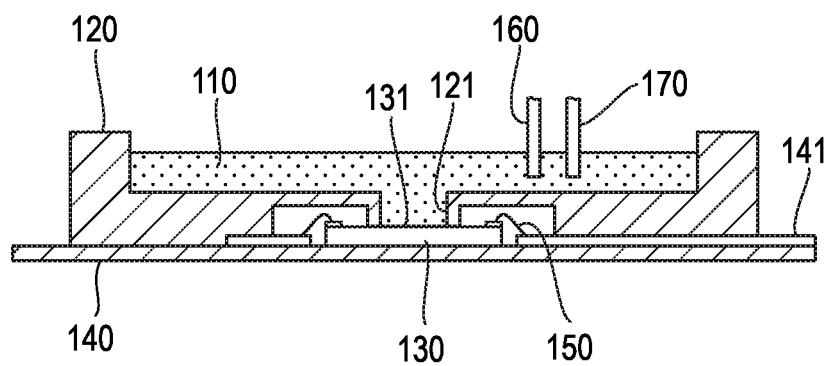
FIG. 5B is a cross-sectional view of the transducer shown in FIG. 5A.
Figure 6:
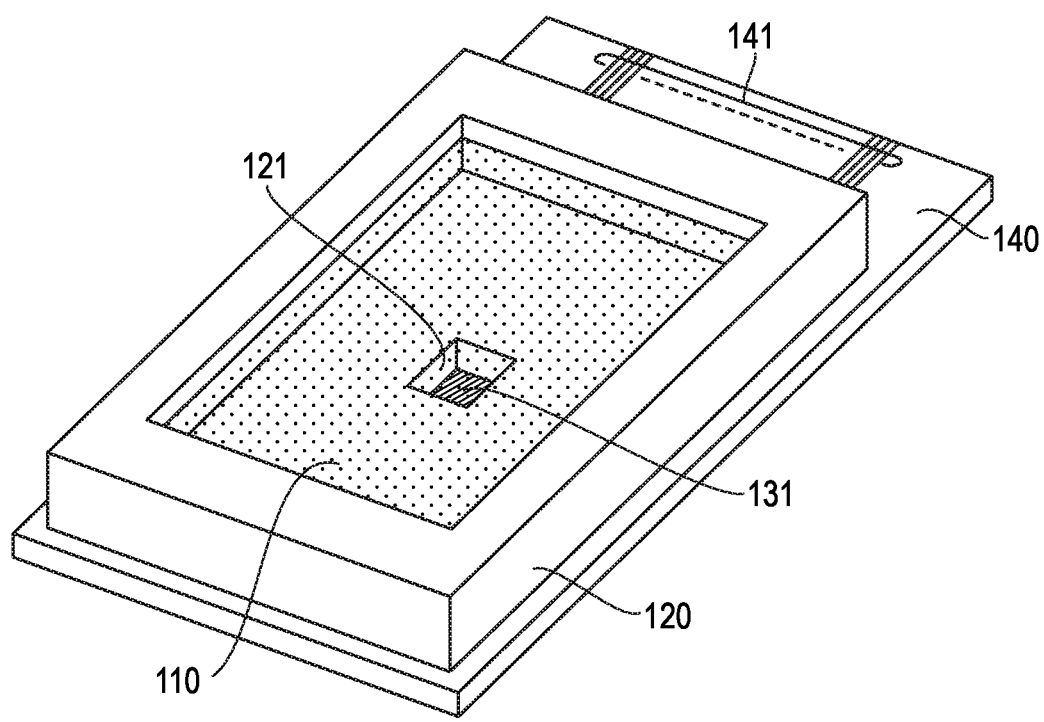
FIG. 6 is a perspective view of the transducer shown in FIG. 5A.
Figure 7:
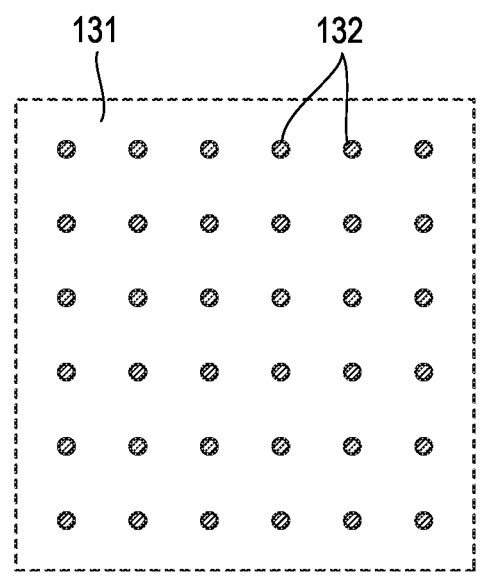
FIG. 7 is a diagram for describing an array of electrodes in the transducer shown in FIG. 5A.

Next, an embodiment of a transducer suitable for the aforementioned electrochemical detection of the catalytic reaction product will be described with reference to FIGS. 5 to 7.

The transducer of the present embodiment has a structure in which a liquid bath 120 that can contain a solution 110 is mounted on an LSI chip (large scale integrated chip) 130. The liquid bath 120 has a hole 121 at the center thereof and the LSI chip 130 is placed at lower end of the hole 121 and covers the hole 121.

The LSI chip 130 and the liquid bath 120 are fixed to a substrate 140 and a wiring pattern 141 for connecting the LSI chip 130 to an external apparatus that controls the transducer is formed on the substrate 140. Reference numeral 150 in FIG. 5B denotes a bonding wire for connecting the LSI chip 130 to the wiring pattern 141.

A sensor region 131 is formed on the top surface of the LSI chip 130. The sensor region 131 is located in the hole 121 at the bottom surface of the liquid bath 120.

Although details are omitted in FIGS. 5A, 5B and 6, 400 electrodes 132 of φ40 µm that function as working electrodes are formed in the sensor region 131 in this example. The 400 electrodes 132 constitute a 20×20 array, and are arranged at intervals of 250 µm. FIG. 8 shows part of the sensor region 131 in which the electrodes 132 are formed. The material of the electrodes 132 is gold in this example and a silicon nitride film is formed on the top surface of the LSI chip 130 including at least the sensor region 131 except the electrodes 132. The LSI chip 130 has a function to detect currents generated by oxidation reduction reaction between each electrode 132 and an object to be detected, and amplify the respective detected currents.

The LSI chip 130 in this example has a configuration in which the retaining structure 90 that allows an aqueous solution to permeate and can retain the aqueous solution is provided on each electrode 132 or a configuration in which the electrode 132 is located in each well 105 arranged in an array in the sensor region 131 and the retaining structure 90 is provided in each well 105. Therefore, the present transducer can strongly retain on each electrode 132 the first lump of liquid where a catalytic reaction takes place. In FIGS. 5 and 6, the solution 110 is the second lump of liquid that covers the first lump of liquid and the first lump of liquid is not shown. A counter electrode 160 and a reference electrode 170 are not necessarily essential components of the transducer. The counter electrode 160 and the reference electrode 170 are introduced into the second lump of liquid before implementing the method of the present embodiment.

Addendum

Although the present invention has been described with reference to the illustrative embodiment, those skilled in the art will understand that various changes can be made without departing from the scope of the present invention and the elements thereof can be replaced by equivalents. Moreover, many modifications can be made to adapt a specific system, device or components thereof to the teachings of the present invention without departing from the intrinsic scope of the present invention. Therefore, the present invention is not limited to a specific embodiment disclosed to implement the present invention, but includes all embodiments included in the appended scope of claims.

Furthermore, the terms like "first," "second" or the like are used not to indicate order or importance, but to distinguish the elements. The terms used in the present specification is intended to describe the embodiment and is in no way intended to limit the present invention. The term "include" and inflections thereof, when used in the present specification and/or the appended scope of claims, clarify the presence of the mentioned features, steps, operations, elements and/or components, but do not exclude the presence or addition of one or a plurality of other features, steps, operations, elements, components and/or the group thereof. The term "and/or" includes, if present, one or a plurality of all sorts of combinations of related and listed elements. In the scope of claims and the specification, "connection," "combination," "joining," "coupling" or synonyms thereof and all inflections thereof do not necessarily deny the presence of one or more "interconnected" or "combined" or "coupled" intermediate elements unless otherwise specified.

All terms used in the present specification (including technical terms and scientific terms) have the same meanings generally understood by those skilled in the art to which the present invention belongs unless otherwise specified. Furthermore, terms such as those defined in commonly used dictionaries should be interpreted as having meanings consistent with meanings in context of the related arts and the present disclosure, and should not be interpreted ideally or excessively formally unless explicitly defined.

It will be understood that the present invention has disclosed many techniques and steps in the description thereof. Those techniques and steps have their respective individual advantages and can also be used in combination with one or more or, in some cases, all of other disclosed techniques. Therefore, to avoid complications, the present specification refrains from describing all possible combinations of the individual techniques or steps. However, the specification and claims should be read with an understanding that such combinations are totally included in the present invention and the scope of claims.

In the following claims, corresponding structures, materials, actions and equivalents of all functional elements combined with parts or steps, if present, are intended to include structures, materials or actions to execute functions in combination with other claimed elements.

Although the embodiment of the present invention has been described so far, the present invention is not limited to the embodiment. Various changes and modifications are allowed without departing from the spirit of the present invention. The selected and described embodiment is intended to describe principles of the present invention and practical applications thereof. The present invention is used as various embodiments along with various changes or modifications, and the various changes or modifications are determined according to expected use. All such changes and modifications are intended to be included in the scope of the present invention defined by the appended claims, and are intended to be granted the same protection when interpreted according to a range given impartially, legally and fairly.

DESCRIPTION OF REFERENCE NUMERALS

10 liquid bath
11 bottom surface
20 first lump of liquid
30 second lump of liquid
40 working electrode
50 counter electrode
60 reference electrode
70 salt bridge
80 potentiostat
81 variable power supply
82 voltmeter
83 ammeter
90, 91, 92, 94, 95, 96 retaining structure
91', 96' solution
92' small block
93 resin-impregnated sheet-like porous body
93' sheet-like porous body
95' suspension
100 substrate
105 well
106 resin layer
110 solution
120 liquid bath
121 hole
130 LSI chip 131 sensor region
132 electrode
140 substrate
141 wiring pattern
150 bonding wire
160 counter electrode
170 reference electrode

What is claimed is:

1. A method of electrochemically detecting a catalytic reaction product that is generated by a catalytic reaction progressing in a first lump of liquid, the catalytic reaction product being dissolved in the first lump of liquid, the method comprising:
containing the first lump of liquid and a second lump of liquid in a liquid bath so that the second lump of liquid is in contact with the first lump of liquid forming a liquid-liquid interface thereby, the second lump of liquid not dissolving the catalytic reaction product, wherein a retaining structure that retains the first lump of liquid is provided in the liquid bath, the retaining structure being permeable to the first lump of liquid;
arranging a working electrode and a counter electrode in the first lump of liquid and in the second lump of liquid respectively; and
detecting the catalytic reaction product by measuring a current flowing through the working electrode caused by an oxidation or reduction reaction of the catalytic reaction product at the working electrode;
wherein the catalytic reaction progresses and said step of detecting the catalytic reaction is performed in a state in which the first lump of liquid is retained by the retaining structure.

2. The method according to claim 1, wherein said step of containing the first lump of liquid and the second lump of liquid in the liquid bath further comprises the steps of:
dropping the first lump of liquid on the retaining structure; and
pouring the second lump of liquid into the liquid bath subsequently.

3. The method according to claim 1, wherein the retaining structure is made of a porous body having a hydrophilic surface.

4. The method according to claim 1, wherein the retaining structure is made of a polymer forming hydrogels by absorption of water.

5. The method according to claim 1, wherein a catalyst associated with the catalytic reaction is supported by the retaining structure.

6. The method according to claim 1, wherein
the retaining structure is placed in a well constructed on a bottom surface of the liquid bath.

7. A method of electrochemically detecting a plurality of catalytic reaction products that are generated by a plurality of catalytic reactions progressing each in a plurality of first lumps of liquids, each of the plurality of catalytic reaction products being dissolved in corresponding one of the plurality of first lumps of liquids, the method comprising:
containing the plurality of first lumps of liquids and a second lump of liquid in a liquid bath so that the second lump of liquid is in contact with each of the plurality of first lumps of liquids forming liquid-liquid interfaces thereby, the second lump of liquid not dissolving any of the plurality of the catalytic reaction products, wherein a plurality of retaining structures that each retain the plurality of the first lumps of liquids are provided in the liquid bath, each of the plurality of retaining structures being permeable to corresponding one of the plurality of the first lumps of liquids;
arranging a plurality of working electrodes each in the plurality of the first lumps of liquids;
arranging a counter electrode in the second lump of liquid; and
detecting the plurality of catalytic reaction products by measuring a plurality of currents each of which flows through a corresponding one of the plurality of working electrodes by an oxidation or reduction reaction of a corresponding one of the plurality of the catalytic reaction products at the corresponding one of the plurality of working electrodes;
wherein the plurality of catalytic reactions progress and said step of detecting the plurality of catalytic reaction products is performed in a state in which the plurality of the first lumps of liquids are each retained by the plurality of the retaining structures.

8. The method according to claim 7, wherein
each of the plurality of retaining structures is located in corresponding one of a plurality of wells constructed on a bottom surface of the liquid bath.

9. An apparatus for electrochemically detecting a catalytic reaction product that is generated by a catalytic reaction, the apparatus comprising:
a liquid bath having an internal space and a bottom surface thereof;
a first lump of liquid located at the bottom surface of the liquid bath, the catalytic reaction being able to progress in the first lump of liquid;
a second lump of liquid which covers the first lump of liquid forming a liquid-liquid surface therebetween in the internal space of the liquid bath;
a working electrode provided in the internal space such that the working electrode is in contact with the first lump of liquid but not in contact with the second lump of liquid;
a counter electrode being placed in the second lump of liquid in the internal space such that the counter electrode is not in contact with the first lump of liquid; and
a retaining structure disposed in a portion of the internal space which the working electrode faces, the retaining structure being permeable to the first lump of liquid, wherein the first lump of liquid is retained by the retaining structure.

10. The apparatus according to claim 9, wherein the retaining structure is made of a porous body having a hydrophilic surface.

11. The apparatus according to claim 9, wherein the retaining structure is made of a polymer forming hydrogels by absorption of water.

12. The apparatus according to claim 9, wherein a catalyst associated with the catalytic reaction is directly or indirectly bound to the retaining structure.

13. The apparatus according to claim 9, wherein
a well is constructed in the internal space of the liquid bath, and
the retaining structure is disposed in the well.

14. An apparatus for electrochemically detecting a plurality of catalytic reaction products that are generated by a plurality of catalytic reactions, the apparatus comprising:
a liquid bath having an internal space and a bottom surface thereof;
a plurality of lumps of aqueous solutions each located at the bottom surface of the liquid bath, each of the plurality of catalytic reactions being able to progress in corresponding one of the plurality of lumps aqueous solutions;

a second lump of liquid which covers each of the plurality of lumps of aqueous solutions forming a plurality of liquid-liquid surfaces between the second lump of liquid and each of the plurality of lumps of aqueous solutions in the internal space of the liquid bath;

a plurality of working electrodes provided in the internal space such that each of the plurality of working electrodes is in contact with corresponding one of the plurality of lumps of aqueous solutions but not in contact with the second lump of liquid;

a counter electrode being placed in the second lump of liquid in the internal space such that the counter electrode is not in contact with any one of the plurality of lumps of aqueous solutions; and a plurality of retaining structures each of which is disposed in a respective portion of the internal space, the respective portion of the internal space being faced by corresponding one of the plurality of working electrodes respectively, the plurality of retaining structures being each permeable to the aqueous solutions, wherein the plurality of lumps of aqueous solutions is retained by the plurality of retaining structures, respectively.

15. The apparatus according to claim 14, wherein a plurality of wells are constructed in the internal space of the liquid bath, and the plurality of retaining structures are each provided in the plurality of wells.

* * * * *